(No Model.)
G. B. STEVENSON.
SLIDE VALVE.
No. 369,134. Patented Aug. 30, 1887.
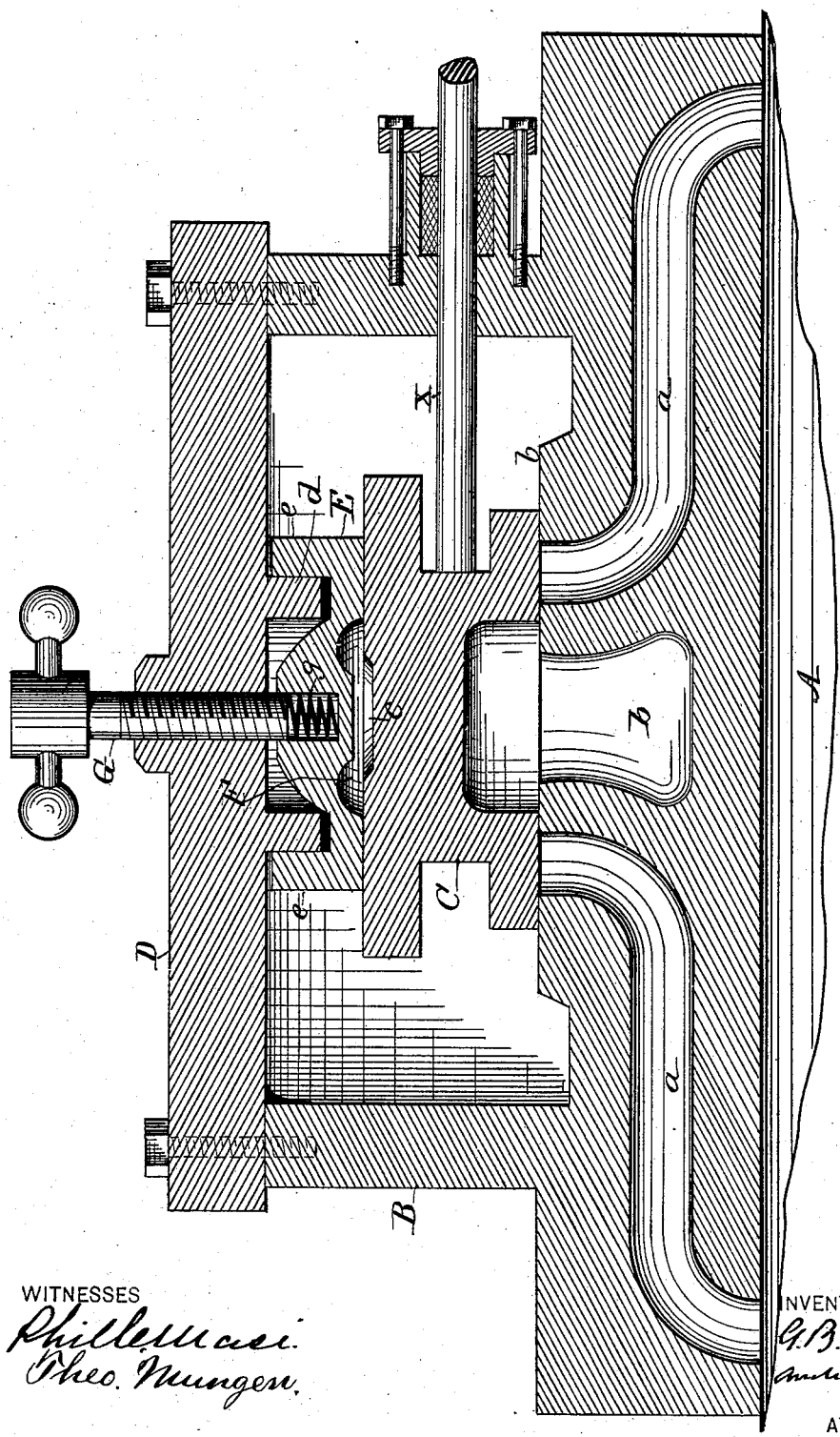
WITNESSES
INVENTOR
ATTORNEYS

UNITED STATES PATENT OFFICE.

GEORGE B. STEVENSON, OF UPPER SANDUSKY, OHIO.

SLIDE-VALVE.

SPECIFICATION forming part of Letters Patent No. 369,134, dated August 30, 1887.

Application filed December 20, 1886. Serial No. 222,086. (No model.)

*To all whom it may concern:*

Be it known that I, GEORGE B. STEVENSON, a citizen of the United States, and a resident of Upper Sandusky, in the county of Wyandot and State of Ohio, have invented certain new and useful Improvements in Slide-Valves; and I do declare the following to be a full, clear, and exact description of the invention, such as will enable others skilled in the art to which it appertains to make and use the same, reference being had to the accompanying drawing, and to letters or figures of reference marked thereon, which form a part of this specification.

The figure of the drawing is a vertical section of the valve.

The invention relates to improvements in balanced slide-valves; and it consists in the construction and novel arrangement of parts hereinafter described and claimed.

Referring to the accompanying drawing, A designates the upper portion of the cylinder, and B the steam-chest superimposed thereon.

$a\ a$ are the steam-ports formed in the side of the cylinder in the usual well-known manner, and $b$ is the exhaust-port between the same.

$b'$ is the valve-seat upon which said ports open.

C is the slide-valve, cast in one heavy and rigid block, or having its upper or outer surface suitably attached thereto and made flat, and provided centrally with a shallow recess, $c$. On the inner surface of the cover D, which is firmly secured to and forms the outer surface or roof of the steam-chest, is made the circular inwardly-standing flange or ring $d$, situated centrally upon the cover. This flange or ring has its outer surface or periphery turned perfectly true, and serves a purpose hereinafter explained.

E is the relief plate or piece, circular in form, and having around its edge an outwardly-standing flange, $e$, fitted accurately against the outer surface of the ring or flange $d$, so as to form a steam-tight joint therewith. The central part of the relief-plate is made convex outwardly, the inner concave surface forming, with the recess $c$, the relief-chamber F, contiguous to the outer surface of the valve. The flat circumferential part of the face or inner surface of the relief-plate, or that portion between the chamber F and the edge of said plate, is made to fit accurately against the outer surface of the valve to form a steam-tight joint therewith.

G is a screw or bolt passing through a central threaded opening in the cover D, and with its point inside the steam-chest bearing on the outer end of a coiled spring, $g$, situated in a central recess, $g'$, in the relief-plate, which is thickened centrally in order to give said recess a suitable depth. The said bolt or screw is turned by a hand-wheel, lever, or other suitable device on its outer end, and the valve is reciprocated by its rod X and other suitable and well-known means.

By means of the screw or bolt the bearing of the relief-plate may be tightened on the valve to take up wear or for other purposes, and the coil-spring does away with the stiffness and rigidity of said plate on the valve. As the steam in the steam-chest cannot penetrate into the relief-chamber E, nor between the relief-plate and the circular flange or ring, the pressure is taken off the outer surface of the valve-block and the valve relieved on its seats and balanced. The screw or bolt is turned only sufficiently inward to keep the valve from rising from its seat as it reciprocates.

It will be observed that I use but a single relief-piece, E, between the back of the valve and the cover of the steam-chest, said piece being recessed on its bottom side opposite a recess in the back of the valve, and said piece having an annular interiorly-ground flange, $e$, adapted to receive steam-tight the annular exteriorly-ground ring or flange $d$ on the bottom of the steam-chest cover; also, that the said relief-piece is adapted to receive a coiled spring and the lower end of the adjusting-screw. The said parts are thus greatly simplified and rendered more useful.

Having described my invention, what I claim, and desire to secure by Letters Patent, is—

The combination, with the valve and valve-seat, ported as described, the valve-back being recessed at C, of the annular relief-piece E, recessed in the bottom and top, the annular flange d, ground into the flange of said relief-piece and formed integral with the cover of the valve-chest, the coiled spring g in the upper central recess of said relief-piece, and the adjusting-screw tapped through the cover D, entering the latter recess and bearing upon said spring, all substantially as specified.

In testimony whereof I affix my signature in presence of two witnesses.

GEORGE B. STEVENSON.

Witnesses:
 JOHN SEIDER,
 DAVID C. PARKER.